Patented Dec. 25, 1923.

1,478,445

UNITED STATES PATENT OFFICE.

BENJAMIN C. McCLURE, OF HARTSDALE, NEW YORK, ASSIGNOR TO JOHNS-MANVILLE, INCORPORATED, A CORPORATION OF NEW YORK.

AUTOMATIC LEAK DETECTOR.

No Drawing.    Application filed January 8, 1923.    Serial No. 611,544.

*To all whom it may concern:*

Be it known that I, BENJAMIN C. MC-CLURE, a citizen of the United States of America, residing at Hartsdale, Westchester County, New York, have invented certain new and useful Improvements in Automatic Leak Detectors, of which the following is a specification.

My invention relates, generally, to means for automatically indicating any leakage of fluid through the wall of a vessel containing it, and, in the particular embodiment thereof, herein described, is specifically designed to indicate leakage of acids.

This result is secured by painting the exterior of the vessel with a composition containing a pigment of characteristic color which when attacked by the escaping liquid of the vessel, will combine or react therewith chemically to form a material of a different color or one devoid of color. Thus any incipient lekage through the wall of the vessel will produce immediately a spot of noticeably different appearance on the exterior of the vessel at and about the point of leakage which will immediately attract the attention of the inspector, workmen or other observers, and so call attention to the fact that a leak is occurring before the wall of the tank or vessel is corroded sufficiently to seriously damage it, or before any considerable quantity of the liquid has escaped. This permits remedial measures to be taken before substantial loss or damage occurs.

As an example of a preferred embodiment of my invention, so far as at present advised, I will describe a paint containing ultramarine as a pigment of characteristic blue color applied to the exterior surface of a vessel containing sulphuric acid. A yellow spot appears at the point where any leakage of the acid occurs which is the result of the interaction between the acid and the ultramarine.

Tanks for holding sulphuric acid are frequently made of iron or steel with an acid-proof lining. According to my invention, I may cover the exterior of such a tank with a paint composed of bakelite, one part by weight, well diluted with acetone, and one part of ultramarine. The dissolved bakelite serves as a vehicle and the ultramarine as the pigment, forming a paint of a dark blue color. When any leakage through the wall of the tank occurs the sulphuric acid reacts with the ultramarine, liberating free sulphur with the consequent appearance of the characteristic yellow color of sulphur at the point of the reaction.

The chemical formula for ultramarine is $2(Na_2Al_2Si_2O_8).Na_2S_2$, and when this is attacked by sulphuric acid, the equation representing the resulting reaction is:

$$2(Na_2Al_2Si_2O_8).Na_2S_2 + 10H_2SO_4 = 2Na_3Al_2(SO_4)_4 + 4H_2SiO_3 + 4H_2O + 2NaHSO_4 + H_2S + S.$$

The constituents of the resulting compounds other than sulphur being practically colorless, the pronounced yellow of the sulphur dominates the mass and immediately produces a noticeable yellow stain at and around the point of leakage.

Another blue paint which may be used containing ultramarine as a pigment has the following formula by weight: china wood oil, 34.4 per cent; any suitable drier 11.6 per cent; ultramarine 25.8 per cent; gasoline 10.9 per cent; para cumarone resin 17.3 per cent. When sulphuric acid combines with the ultramarine of this paint the yellow color of the liberated sulphur again dominates the resultant mass and changes its normal dark blue color to a bright yellow.

In other embodiments of my invention the pigment used may be such that when attacked by the leaking acid the coloring matter of the paint is eliminated and only white or colorless masses are formed which produce corresponding spots at and about the points of leakage.

Thus a useful paint of greenish gray color may be employed composed of the following constituents; by weight: linseed oil 16.01 per cent; magnesium resinate .64 per cent; iron sulphide 8.60 per cent; gasoline 7.32 per cent, any suitable drier 0.85 per cent, barites 66.58 per cent. The iron (ferrous) sulphide, being the principal pigment here employed, when attacked by hydrochloric acid, is changed into iron chloride (ferrous chloride) which is colorless. The various other commercial inorganic acids when attacking this paint produce a similar result so far as the lack of color of the resultant products is concerned.

It will be seen therefore that the essence of my invention lies in the use of a paint for the exterior of vessels designed to contain a predetermined liquid, the pigmentation of which paint is produced by a material, or combination of materials, which, when attacked by the escaping liquid, either change color or lose color, so as to promptly attract the attention of the observer. Those skilled in the art, who have been instructed as to the underlying principle involved, can devise many other formulæ for such paint which, when reacting with a given acid or other liquid, will operate to produce the above noted desired result which characterizes my invention.

Having described my invention, I claim:

1. The combination, with a vessel adapted to hold a predetermined liquid, of an exterior coating of paint on said vessel containing coloring material capable of reacting chemically with any escaping portion of said liquid to modify the color of the coating at and around the point of leakage.

2. The combination, with a vessel adapted to hold a predetermined liquid, of an exterior coating of paint on said vessel containing coloring material capable of reacting chemically with any escaping portion of said liquid to produce a material of a different color.

3. The combination, with a vessel adapted to hold any particular inorganic acid, of an exterior coating of paint on said vessel containing a pigment capable of reacting chemically with any escaping portion of said acid to liberate the constituents of said pigment of a different color to an extent which will appreciably modify the color of the vessel's coating at and around the point of leakage.

4. The combination, with a vessel adapted to hold sulphuric acid or similar liquid, of an exterior coating of paint on said vessel containing ultramarine as a pigment.

BENJAMIN C. McCLURE.